US009826432B2

(12) United States Patent
Runeson (10) Patent No.: US 9,826,432 B2
(45) Date of Patent: Nov. 21, 2017

(54) REMOTE SOCKET CONNECTION FOR DATA OFFLOAD (71) Applicant: Telefonaktiebolaget LM Ericsson (publ), Stockholm (SE)

(72) Inventor: Stefan Runeson, Lund (SE)

(73) Assignee: TELEFONAKTIEBBOLAGET LM ERICSSON (PUBL), Stockholm (SE)

( * ) Notice: Subject to any disclaimer, the term of this patent is extended or adjusted under 35 U.S.C. 154(b) by 78 days.

(21) Appl. No.: 15/035,818

(22) PCT Filed: Nov. 4, 2014

(86) PCT No.: PCT/EP2014/073736
§ 371 (c)(1),
(2) Date: May 11, 2016

(87) PCT Pub. No.: WO2015/071136
PCT Pub. Date: May 21, 2015

(65) Prior Publication Data
US 2016/0309365 A1 Oct. 20, 2016

(30) Foreign Application Priority Data
Nov. 12, 2013 (EP) .................................. 13192467

(51) Int. Cl.
H04W 28/00 (2009.01)
H04W 28/08 (2009.01)
(Continued)

(52) U.S. Cl.
CPC ....... H04W 28/085 (2013.01); H04L 12/6418 (2013.01); H04L 69/162 (2013.01);
(Continued)

(58) Field of Classification Search
None
See application file for complete search history.

(56) References Cited

U.S. PATENT DOCUMENTS

2007/0074282 A1* 3/2007 Black .................... H04L 63/166
726/14
2007/0173283 A1 7/2007 Livet et al.
(Continued)

FOREIGN PATENT DOCUMENTS

WO 2014018440 A1 1/2014

OTHER PUBLICATIONS

Kristiansson, Johan et al., "Application-layer Mobility Support for Streaming Real-time Media", IEEE Wireless Communications and Networking Conference (WCNC), vol. 1, Mar. 21, 2004, 268-273.
(Continued)

*Primary Examiner* — Hassan Phillips
*Assistant Examiner* — Gautam Sharma
(74) *Attorney, Agent, or Firm* — Murphy, Bilak & Homiller, PLLC (57) ABSTRACT An arrangement for a wireless communication device is disclosed. The arrangement is adapted to set up an application connection between an application of an application layer of the device and a remote server. The device comprises a modem subsystem (comprising the application layer, a remote socket client and a remote socket API between the application layer and the remote socket client), an application processor (comprising a remote socket server and an IP stack, wherein the application processor is associated with a wireless communication access unit and the IP stack is adapted to connect to a communication network using the access unit), and a remote socket protocol communication channel between the remote socket client and the remote socket server. The application is adapted to send an application connection setup request to the remote socket client via the remote socket API. The remote socket client, the remote socket server and the remote socket protocol communication channel are collectively adapted to use a (Continued)

remote socket protocol to set up a remote socket connection between the remote socket client and the remote server via the remote socket server and via the IP stack, using the remote socket protocol communication channel and the wireless communication access unit, and to establish the application connection based on the remote socket connection. The remote socket client is further adapted to (in response to the application connection being established) send an application connection setup response to the application via the remote socket API.

14 Claims, 3 Drawing Sheets

(51) Int. Cl.

| | |
|---|---|
| *H04L 12/64* | (2006.01) |
| *H04W 4/20* | (2009.01) |
| *H04L 29/06* | (2006.01) |
| *H04W 4/00* | (2009.01) |
| *H04W 76/02* | (2009.01) |
| *H04L 29/08* | (2006.01) |
| *H04W 88/06* | (2009.01) |
| *H04W 92/02* | (2009.01) |
| *H04W 84/12* | (2009.01) |

(52) U.S. Cl.
CPC ........... *H04L 69/321* (2013.01); *H04W 4/008* (2013.01); *H04W 4/20* (2013.01); *H04W 76/023* (2013.01); *H04L 67/141* (2013.01); *H04W 84/12* (2013.01); *H04W 88/06* (2013.01); *H04W 92/02* (2013.01)

(56) References Cited

U.S. PATENT DOCUMENTS

| | | | | |
|---|---|---|---|---|
| 2007/0190977 | A1* | 8/2007 | Fok | ........................ G06F 21/445 |
| | | | | 455/411 |
| 2012/0169874 | A1* | 7/2012 | Thomas | ............. H04N 5/23206 |
| | | | | 348/143 |
| 2012/0224485 | A1 | 9/2012 | Payyappilly et al. | |
| 2012/0317628 | A1* | 12/2012 | Yeager | ................. G06Q 20/204 |
| | | | | 726/5 |
| 2013/0229270 | A1 | 9/2013 | Srinivasan et al. | |

OTHER PUBLICATIONS

Leech, M. et al., "SOCKS Protocol Version 5", Network Working Group, RFC 1928, Mar. 1996, 1-9.

* cited by examiner

REMOTE SOCKET CONNECTION FOR DATA OFFLOAD

TECHNICAL FIELD

The present invention relates to the field of establishment of a connection between a wireless communication device and a remote server.

BACKGROUND

A typical wireless communication device (e.g. a mobile phone) of today comprises an application processor and a modem subsystem.

The application processor may typically be a system on a chip (SoC) adapted to support applications running in an environment provided by a mobile operating system. Example tasks that may be supported by the application processor include memory management, graphics processing and multimedia decoding.

The modem subsystem is typically operating independently from the application processor and may be implemented on a separate chip. The modem subsystem typically supports the cellular communication access of the wireless communication device and all related processing (e.g. radio frequency processing, baseband processing, etc.).

Wireless communication access techniques other than the cellular communication access, e.g. wireless local area network (WLAN) access and Bluetooth access, are typically connected to (or comprised in) the application processor.

Figure 1:
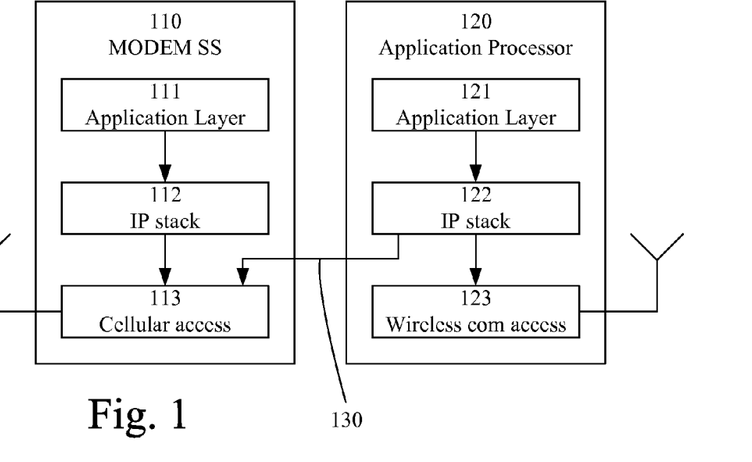
FIG. 1 is a schematic block diagram illustrating an example arrangement according to the prior art.

FIG. 1 illustrates a typical arrangement of a wireless communication device comprising an application processor 120 and a modem subsystem (MODEM SS) 110. The modem subsystem 110 includes an application layer 111, an Internet protocol (IP) stack 112 and a cellular communication access unit 113. The application processor 120 includes an application layer 121, an Internet protocol (IP) stack 122 and a wireless communication access unit 123 (typically implementing a wireless communication access technique which is not a cellular communication access).

The IP stack 112 of the modem subsystem and the IP stack 122 of the application processor operate separately from each other. The IP stack 122 of the application processor 120 is typically allowed to use any or both of the wireless communication access unit 123 and the cellular communication access unit 113 (as illustrated by 130) to implement wireless communication access.

On the other hand, the IP stack 112 of the modem subsystem 110 is typically only allowed to use the cellular communication access unit 113 to implement wireless communication access. Thus, an IP-based application of the modem subsystem can typically not use the wireless communication access unit 123 (e.g. WLAN, Bluetooth) for communication. This is a disadvantage since the utilization of communication resources for the IP-based application is quite inflexible. Examples of IP-based applications of the modem subsystem include VoLTE (voice over LTE (long term evolution)) and SUPL (secure user plane location).

One possible solution might include redesign of the interfaces and permissions associated with the interaction between the modem subsystem and the application processor. This is related to a huge design effort, and does not provide a solution in relation to existing designs. Furthermore, it is often desirable to combine a modem subsystem of one vendor or manufacturer with an application processor of another vendor or manufacturer, without being able to influence the design of the modem subsystem and application processor, respectively.

Therefore, there is a need for arrangements and methods to set up a connection between an application of the modem subsystem and a remote server using a wireless communication access associated with the application processor.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of some embodiments to obviate at least some of the above disadvantages and to provide arrangements and methods to set up a connection between an application of the modem subsystem and a remote server using a wireless communication access unit associated with the application processor.

According to a first aspect, this is achieved by an arrangement for a wireless communication device adapted to set up an application connection between an application of an application layer of the wireless communication device and a remote server. The wireless communication device comprises a modem subsystem and an application processor. The modem subsystem comprises the application layer, a remote socket client and a remote socket application programming interface (API) between the application layer and the remote socket client. The application processor comprises a remote socket server and an interne protocol (IP) stack. The application processor is associated with a wireless communication access unit. The IP stack is adapted to connect to a communication network using the wireless communication access unit. The wireless communication device also comprises a remote socket protocol communication channel between the remote socket client and the remote socket server.

The application is adapted to send an application connection setup request to the remote socket client via the remote socket API. The remote socket client, the remote socket server and the remote socket protocol communication channel are collectively adapted to (in response to the application sending the application connection setup request) use a remote socket protocol to set up a remote socket connection between the remote socket client and the remote server via the remote socket server and via the IP stack, using the remote socket protocol communication channel and the wireless communication access unit. The remote socket client, the remote socket server and the remote socket protocol communication channel are also collectively adapted to establish the application connection based on the remote socket connection. The remote socket client is further adapted to (in response to the application connection being established) send an application connection setup response to the application via the remote socket API.

The application may, for example, be an IP-based application.

The communication network may, for example, be the Internet.

In some embodiments, the arrangement also comprises the wireless communication unit.

In some embodiments, the wireless communication access unit is comprised in the application processor.

According to some embodiments, the remote socket client may be a socket secure (SOCKS) client, the remote socket API may be a SOCKS API, the remote socket server may be a SOCKS server, the remote socket protocol may be a SOCKS protocol, and the remote socket connection may be a SOCKS connection.

The wireless communication unit may, according to some embodiments, be adapted to establish wireless communication access using one or more of a wireless local area network (WLAN) access technique, a Bluetooth access technique, and a device-to-device communication access technique.

In some embodiments, the remote socket protocol communication channel between the remote socket client and the remote socket server may comprise one of: an inter process communication mechanism, a universal serial bus (USB), an IP network, and a memory shared by the application processor and the modem subsystem.

To set up the remote socket connection between the remote socket client and the remote server the remote socket client may, for example, be further adapted to transmit a remote socket connection request to the remote socket server based on the remote socket protocol and the remote socket server may, for example, be further adapted to connect to the remote server via the IP stack using and the wireless communication access unit and transmit a remote socket connection response to the remote socket client based on the remote socket protocol.

The remote socket server may, in some embodiments, be further adapted to authenticate the remote socket client before connecting to the remote server.

A second aspect is a wireless communication device comprising the arrangement according to the first aspect.

According to a third aspect, a method of a wireless communication device of setting up an application connection between an application of an application layer of the wireless communication device and a remote server is provided. The wireless communication device comprises an application processor and a modem subsystem. The modem subsystem comprises the application layer, a remote socket client and a remote socket application programming interface (API) between the application layer and the remote socket client. The application processor comprises a remote socket server and an internet protocol (IP) stack. The application processor is associated with a wireless communication access unit and the IP stack is adapted to connect to a communication network using the wireless communication access unit.

The method comprises sending an application connection setup request from the application to the remote socket client via the remote socket API; using a remote socket protocol to set up a remote socket connection between the remote socket client and the remote server via the remote socket server and via the IP stack, using remote socket protocol communication channel between the remote socket client and the remote socket server and the wireless communication access unit; establishing the application connection based on the remote socket connection; and sending an application connection setup response from the remote socket client to the application via the remote socket API.

In some embodiments, the method may further comprise using the application connection to communicate data packets between the application and the remote server.

According to some embodiments, using the remote socket protocol to set up the remote socket connection between the remote socket client and the remote server may comprise: transmitting a remote socket connection request from the remote socket client to the remote socket server based on the remote socket protocol; connecting the remote socket server to the remote server via the IP stack using the wireless communication access unit; and transmitting a remote socket connection response from the remote socket server to the remote socket client based on the remote socket protocol.

Using the remote socket protocol to set up the remote socket connection between the remote socket client and the remote server may, according to some embodiments, further comprise authenticating the remote socket client by the remote socket server before connecting the remote socket server to the remote server.

A fourth aspect is a computer program product comprising a computer readable medium, having thereon a computer program comprising program instructions, the computer program being loadable into a data-processing unit and adapted to cause the data-processing unit to execute method steps according to the third aspect when the computer program is run by the data-processing unit.

In some embodiments, the third and fourth aspects may additionally have features identical with or corresponding to any of the various features as explained above for the first aspect.

An advantage of some embodiments is that setting up of a connection between an application of the modem subsystem and a remote server using a wireless communication access unit associated with the application processor is enabled.

Another advantage of some embodiments is that flexibility is provided in relation to utilization of communication resources for an IP-based application of the modem subsystem.

Yet another advantage of some embodiments is that no redesign of the modem subsystem and the application processor is needed.

BRIEF DESCRIPTION OF THE DRAWINGS

Further objects, features and advantages will appear from the following detailed description of embodiments, with reference being made to the accompanying drawings, in which.

DETAILED DESCRIPTION

In the following, embodiments will be described where a connection may be set up between an application of the modem subsystem of a wireless communication device and a remote server using a wireless communication access associated with the application processor of the wireless communication device.

In some embodiments, SOCKS may be used to establish the connection, and the following example embodiment will refer to SOCKS for illustrative purposes. SOCKS is an Internet protocol defined in RFC 1928: "SOCKS Protocol Version 5" (available, for example, from http://www.ietf.org/rfc/rfc1928.txt). The SOCKS protocol is typically used for firewall traversal as illustrated in FIG. 2.

Figure 2:
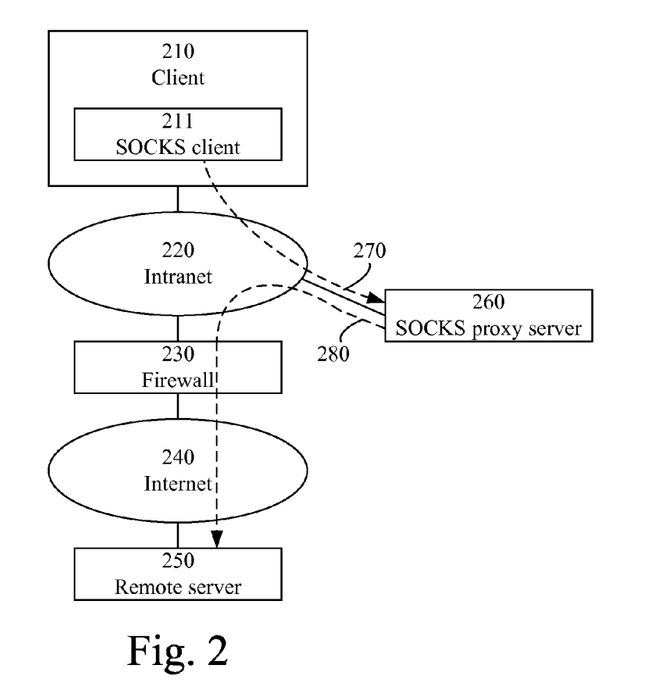
FIG. 2 is a schematic block diagram illustrating an example application of SOCKS.

FIG. 2 schematically illustrates an example architecture and message flow of SOCKS. In the example application of SOCKS illustrated in FIG. 2, a client 210 (including a SOCKS client 211) and a SOCKS proxy server 260 are connected through an intranet 220. The intranet 220 is protected from the Internet 240 by a firewall 230. A remote server 250 is connected to the Internet and resides on the other side of the firewall 230. As illustrated by 270, the SOCKS client 211 may request the SOCKS proxy server 260 to a establish Transmission Control Protocol (TCP) connection to the remote server 250 and to forward User Datagram Protocol (UDP) packets on behalf of the SOCKS client 211. In response to the request from the SOCKS client 211, the SOCKS server 260 performs an authentication of the SOCKS client 211 to ensure that only authorized users (clients) utilize the service. If the SOCKS client 211 is authorized, the SOCKS server 260 establishes the TCP connection and forwards UDP packets through the firewall 230 on behalf of the SOCKS client 211, as illustrated by 280. Thus, a SOCKS client 211 may use the IP stack on a remote system (the SOCKS proxy server 260 in this example).

According to embodiments of the invention, a SOCKS server is deployed on the application processor of a wireless communication device and a SOCKS client is deployed on the modem subsystem of the wireless communication device. The SOCKS server uses the IP stack of the application processor of the wireless communication device. This approach enables that an application on the modem subsystem use the IP stack on the application processor through the SOCKS server of the application processor. Hence, an IP-based application on the modem subsystem can use a wireless communication access unit associated with the application processor for wireless communication.

Figure 3:
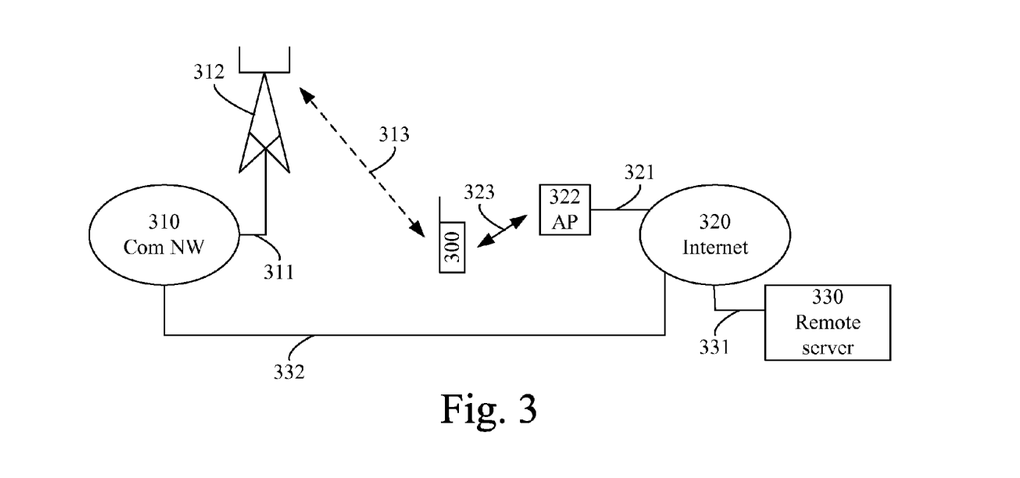
FIG. 3 is a schematic drawing illustrating example connection setups according to some embodiments.
Figure 4:
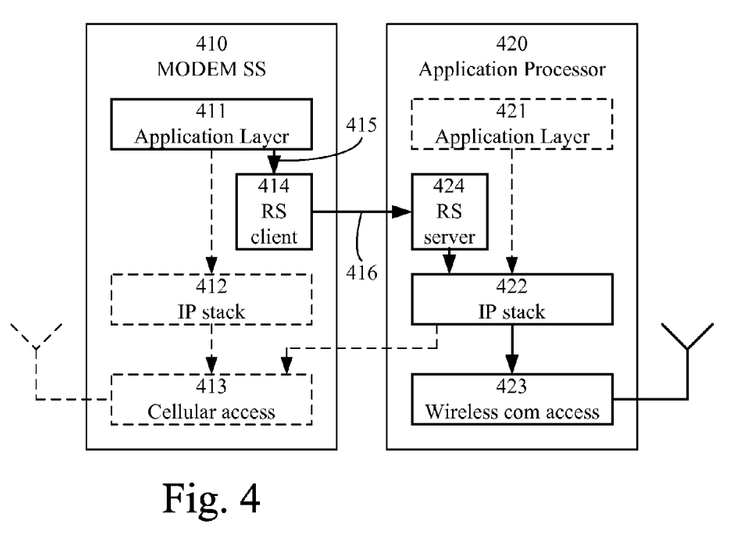
FIG. 4 is a schematic block diagram illustrating an example arrangement according to some embodiments.

FIG. 3 is a schematic drawing illustrating example connection setups according to some embodiments and FIG. 4 is a schematic block diagram illustrating an example arrangement according to some embodiments.

In FIG. 3, a wireless communication deice 300 is adapted to communicate with a cellular communication network (Com NW) 310 via a cellular radio base station 312 using a radio link 313 and a backhaul link 311. The communication with the cellular communication network 310 is typically implemented by a cellular communication access unit of a modem subsystem of the wireless communication device 300 (compare with the cellular communication access unit 113 of FIG. 1). It is possible for the wireless communication device 300 to access a remote server 330 of the Internet 320 via the cellular communication network 310 as illustrated by the operative connections 331 and 332 between the cellular communication network 310 and the Internet 320 and between the Internet 320 and the remote server 330, respectively.

The wireless communication deice 300 is also adapted to communicate with the Internet 320 (and thus with the remote server 330) via an access point (AP) 322 using a radio link 323 and a backhaul connection 321. The access point 322 may, for example, be a WLAN access point implementing an IEEE 802.11 standard. The communication with the access point 322 is typically implemented by a wireless communication access unit of an application processor of the wireless communication device 300 (compare with the wireless communication access unit 123 of FIG. 1).

It should be noted that the access point 322 in FIG. 3, implementing the communication between the wireless communication device 300 and the Internet 320, is merely an example. Embodiments of the invention are equally applicable to any suitable wireless communication technique between the wireless communication device and the Internet implemented by a wireless communication access unit associated with the application processor of the wireless communication device 300.

As elaborated on above, it may be desirable that an application of the modem subsystem of the wireless communication device 300 has the option to communicate with the remote server 330 via the access point 322 in stead of via the cellular communication network 310. FIG. 4 illustrates an example arrangement according to some embodiments enabling a connection between an application of the modem subsystem and a remote server using a wireless communication access unit associated with the application processor. The arrangement of FIG. 4 may, for example, be comprised in the wireless communication device 300 of FIG. 3.

The example arrangement of FIG. 4 comprises an application processor 420 and a modem subsystem (MODEM SS) 410. The modem subsystem 410 includes an application layer 411, an IP stack 412 and a cellular communication access unit 413. The application processor 420 includes an application layer 421, an IP stack 422 and a wireless communication access unit 423 (typically implementing a wireless communication access technique which is not a cellular communication access, e.g. WLAN or Bluetooth). The IP stack 422 is adapted to connect to a communication network using the wireless communication access unit 423. In the arrangement of FIG. 4, the wireless communication access unit 423 is illustrated as comprised in the application processor 420. In other embodiment, the wireless communication access unit 423 may be external to but associated with the application processor 420.

The modem subsystem also comprises a remote socket (RS) client 414 and a remote socket API 415 between the application layer and the remote socket client. The application processor also comprises a remote socket (RS) server 424 which is adapted to use the IP stack 422 of the application processor 420. In the arrangement, a remote socket protocol communication channel 416 between the remote socket client 414 and the remote socket server 424 is also provided to allow transportation of a remote socket protocol (e.g. SOCKS) between the remote socket client 414 and the remote socket server 424.

The arrangement of FIG. 4 is adapted to set up an application connection between an application of the application layer 411 and a remote server (e.g. the remote server 330 of FIG. 3).

To this end, the application sends an application connection setup request to the remote socket client 414 via the remote socket API 415.

Then, the remote socket client 414, the remote socket server 424 and the remote socket protocol communication channel 416 use a remote socket protocol (e.g. SOCKS) to set up a remote socket connection between the remote socket client 414 and the remote server via the remote socket server 424 and via the IP stack 422, using the remote socket protocol communication channel 416 and the wireless communication access unit 423. The set up of the remote socket connection may comprise the remote socket client 414 transmitting a remote socket connection request (e.g. a SOCKS request) to the remote socket server 424 based on the remote socket protocol (e.g. SOCKS). The set up of the remote socket connection may also comprise the remote socket server 424 transmitting a remote socket connection response (e.g. a SOCKS response) to the remote socket client 414 based on the remote socket protocol (e.g. SOCKS) after the remote socket server 424 has connected to the remote server 330 via the IP stack 422 using and the wireless communication access unit 423 and the remote socket protocol (e.g. SOCKS).

After the set up of the remote socket connection, the application connection is established based on the remote socket connection and the remote socket client 414 sends an application connection setup response to the application via the remote socket API 415.

The remote socket protocol communication channel 416 may, for example, be implemented by an IP network (i.e. the remote socket protocol may be transported by IP if the cellular communication access and the wireless communication access of the application processor are connected to the same IP network), by inter process communication (IPC), by a universal serial bus (USB), or similar. In one example, the remote socket protocol communication channel 416 may comprise a memory shared by the application processor 420 and the modem subsystem 410. In the latter case a communication between the remote socket client 414 and the remote socket server 424 may be implemented by exchange of a pointer to a memory location.

The remote socket API 415 may be similar (or even identical) to the socket API between the application layer 411 and the IP stack 412 (e.g. a traditional socket API). An IP-based application on the modem subsystem 410 then typically uses the remote socket API 415 instead of the traditional socket API when utilizing alternative wireless communication access technique associated with the application processor 420.

In some embodiments, only some applications of the modem subsystem 410 are allowed to use the wireless communication access unit 423. In such embodiments, the remote socket server 424 may check authentication of the remote socket client 414 before connecting to the remote server via the wireless communication access unit 423. The authentication may, for example, be according to SOCKS protocol version 5.

Figure 5:
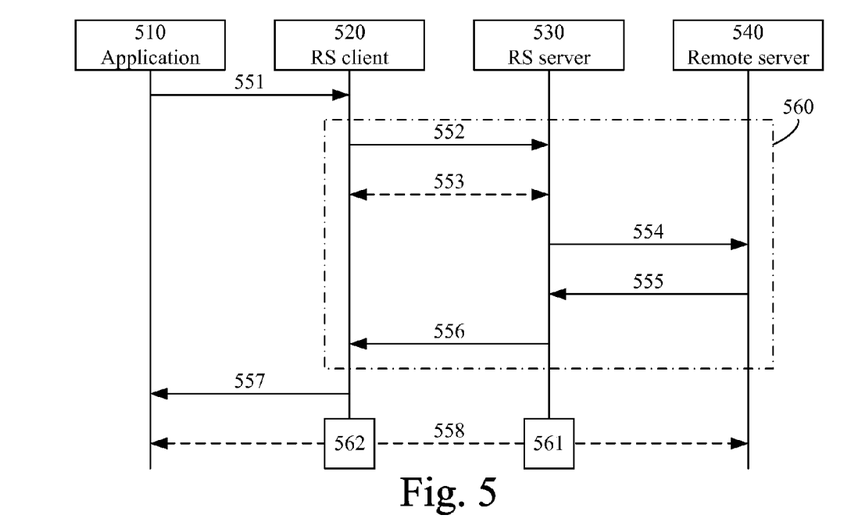
FIG. 5 is a signaling diagram illustrating example signaling according to some embodiments.
Figure 6:
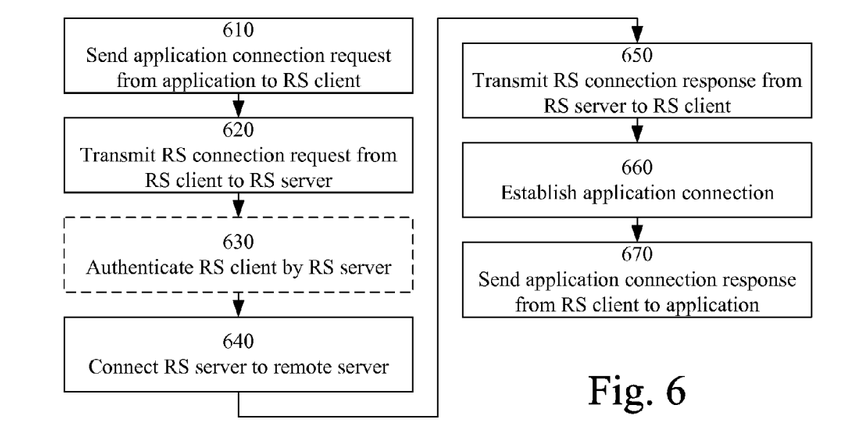
FIG. 6 is a flowchart illustrating example method steps according to some embodiments.

FIG. 5 is a signaling diagram illustrating example signaling according to some embodiments and FIG. 6 is a flowchart illustrating example method steps according to some embodiments. The method of FIG. 6 may, for example, be performed by the arrangement of FIG. 4 and/or by the application 510, the remote socket client 520 and the remote socket server 530 of FIG. 5.

The signaling diagram of FIG. 5 illustrates example signaling between an application 510 of a modem subsystem (compare with an application of the application layer 411 of FIG. 4), a remote socket (RS) client 520 (compare with 414 of FIG. 4), a remote socket (RS) server 530 (compare with 424 of FIG. 4) and a remote server 540 (compare with 330 of FIG. 3). The signaling diagram of FIG. 5 illustrate signaling performed to set up an application connection between the application 510 and a remote server 540 and will be described in connection to the method of FIG. 6.

The method starts in step 610 where an application connection setup request 551 is sent from the application 510 to the remote socket client 520 via a remote socket API. The application connection setup request 551 may indicate a desire of the application to connect to the remote server 540.

The remote socket client 520 receives the application connection setup request 551 and uses a remote socket protocol (e.g. SOCKS) 560 to set up a remote socket connection between the remote socket client 520 and the remote server 540 via the remote socket server 530. Setting up the remote socket connection may comprise transmitting (in step 620) a remote socket connection request 552 from the remote socket client 520 to the remote socket server 530 based on the remote socket protocol, connecting (in step 640) the remote socket server 530 to the remote server 540 based on signaling (e.g. connect message 554 to the remote server 540 and response message 555 from the remote server 540) of the remote socket protocol, and transmitting (in step 650) a remote socket connection response 556 from the remote socket server 530 to the remote socket client 520 based on the remote socket protocol.

The application connection is established in step 660 based on the remote socket connection, and (in step 670) an application connection setup response 557 is sent from the remote socket client 520 to the application 510 via the remote socket API.

The signaling between the remote socket client 520 and the remote socket server 530 is made over a remote socket protocol communication channel. As elaborated on above, the remote socket protocol communication channel may, for example, be implemented by inter process communication (IPC), by a universal serial bus (USB), by IP network, by a shared memory, or similar.

The signaling between the remote socket server 530 and the remote server 540 is made via an IP stack of an application processor using a wireless communication access unit associated with the application processor.

In some embodiments, the method may further comprise using the application connection to communicate data packets between the application 510 and the remote server 540 as illustrated by 558. In such communication, the remote socket client 520 typically relays messages to and from the application as illustrated by 562, and the remote socket server typically packs (or re-packs) the messages to and from the application to suit the format of the wireless communication access unit as illustrated by 561.

As elaborated on above, the remote socket server 530 may also perform authentication 553 of the remote socket client 520 (in step 630) before connecting the remote socket server 530 to the remote server 540.

By application of some embodiments, an application on the modem subsystem of a wireless communication device may use wireless communication access techniques associated with the application processor (e.g. WLAN access).

In embodiments where the SOCKS protocol is applied, a benefit is that the SOCKS protocol is standardized and suitable implementations are already available.

The solution of some embodiments may be deployed in user space of the software architecture. Thus, the deployment according to these embodiments is not dependent on any specific hardware architecture (e.g. WLAN hardware).

Other possible solutions that enable setting up of a connection between an application of the modem subsystem and a remote server using a wireless communication access unit associated with the application processor may require major architectural changes in hardware and/or in kernel mode of the software architecture.

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware. All such forms are contemplated to be within the scope of this disclosure.

Embodiments may appear within an electronic apparatus (such as a wireless communication device) comprising circuitry/logic or performing methods according to any of the embodiments. The electronic apparatus may, for example, be a portable or handheld mobile radio communication equipment, a mobile radio terminal, a mobile telephone, a communicator, an electronic organizer, a smartphone, a computer, a notebook, or a mobile gaming device.

Figure 7:
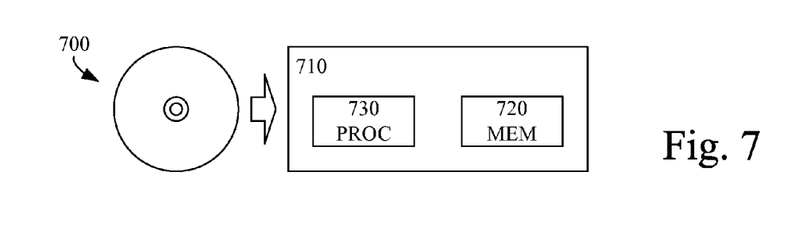
FIG. 7 is a schematic drawing illustrating a computer readable medium according to some embodiments.

According to some embodiments, a computer program product comprises a computer readable medium such as, for example, a diskette, a CD-ROM, a USB-stick, a plug-in card, or an embedded drive. FIG. 7 schematically illustrate an example computer readable medium in the form of a CD-ROM (700). The computer readable medium may have stored thereon a computer program comprising program instructions. The computer program may be loadable into a data-processing unit (730), which may, for example, be comprised in a mobile terminal (710). When loaded into the data-processing unit, the computer program may be stored in a memory (720) associated with or integral to the data-processing unit. According to some embodiments, the computer program may, when loaded into and run by the data-processing unit, cause the data-processing unit to execute method steps according to, for example, the method shown in FIG. 6.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

The invention claimed is:

1. An arrangement for a wireless communication device configured to set up an application connection between an application of an application layer of the wireless communication device and a remote server, the arrangement comprising:
   a modem subsystem comprising the application layer, a remote socket client and a remote socket application programming interface (API) between the application layer and the remote socket client;
   an application processor comprising a remote socket server and an internet protocol (IP) stack, wherein the application processor is associated with a wireless communication access unit and wherein the IP stack is configured to connect to a communication network using the wireless communication access unit, wherein the modem subsystem operates independently from the application processor; and
   a remote socket protocol communication channel between the remote socket client and the remote socket server,
   wherein the application is configured to send an application connection setup request to the remote socket client via the remote socket API;
   wherein the remote socket client, the remote socket server and the remote socket protocol communication channel are collectively configured to:
      in response to the application sending the application connection setup request, use a remote socket protocol to set up a remote socket connection between the remote socket client and the remote server via the remote socket server and via the IP stack, using the remote socket protocol communication channel and the wireless communication access unit; and
      establish the application connection based on the remote socket connection;
   wherein the remote socket client is further configured to, in response to the application connection being established, send an application connection setup response to the application via the remote socket API; and
   wherein the remote socket client is a socket secure (SOCKS) client, the remote socket API is a SOCKS API, the remote socket server is a SOCKS server, the remote socket protocol is a SOCKS protocol, and the remote socket connection is a SOCKS connection.

2. The arrangement of claim 1, wherein the wireless communication unit is configured to establish wireless communication access using one or more of a wireless local area network (WLAN) access technique, a Bluetooth access technique, and a device-to-device communication access technique.

3. The arrangement according to claim 1, wherein the remote socket protocol communication channel between the remote socket client and the remote socket server comprises one of:
   an inter process communication mechanism;
   a universal serial bus (USB);
   an IP network; and
   a memory shared by the application processor and the modem subsystem.

4. The arrangement of claim 1, wherein, to set up the remote socket connection between the remote socket client and the remote server:
   the remote socket client is further configured to transmit a remote socket connection request to the remote socket server based on the remote socket protocol; and
   the remote socket server is further configured to:
      connect to the remote server via the IP stack using and the wireless communication access unit; and
      transmit a remote socket connection response to the remote socket client based on the remote socket protocol.

5. The arrangement of claim 4, wherein the remote socket server is further configured to authenticate the remote socket client before connecting to the remote server.

6. The arrangement of claim 1, wherein, the modem subsystem and the application processor are implemented on separate chips.

7. A wireless communication device comprising the arrangement according to claim 1.

8. A method of a wireless communication device of setting up an application connection between an application of an application layer of the wireless communication device and a remote server, the wireless communication device comprising an application processor and a modem subsystem wherein:
- the modem subsystem comprises the application layer, a remote socket client and a remote socket application programming interface (API) between the application layer and the remote socket client, and
- the application processor comprises a remote socket server and an internet protocol (IP) stack, wherein the application processor is associated with a wireless communication access unit and wherein the IP stack is configured to connect to a communication network using the wireless communication access unit, wherein the modem subsystem operates independently from the application processor;

the method comprising:
- sending an application connection setup request from the application to the remote socket client via the remote socket API;
- using a remote socket protocol to set up a remote socket connection between the remote socket client and the remote server via the remote socket server and via the IP stack, using remote socket protocol communication channel between the remote socket client and the remote socket server and the wireless communication access unit;
- establishing the application connection based on the remote socket connection; and
- sending an application connection setup response from the remote socket client to the application via the remote socket API;

wherein the remote socket client is a socket secure (SOCKS) client, the remote socket API is a SOCKS API, the remote socket server is a SOCKS server, the remote socket protocol is a SOCKS protocol, and the remote socket connection is a SOCKS connection.

9. The method of claim 8, further comprising using the application connection to communicate data packets between the application and the remote server.

10. The method of claim 8, wherein the modem subsystem and the application processor are implemented on separate chips.

11. The method of claim 8, wherein setting up the remote socket connection using the wireless communication unit comprises establishing wireless communication access using one or more of a wireless local area network (WLAN) access technique, a Bluetooth access technique, and a device-to-device communication access technique.

12. The method according to claim 8, wherein the remote socket protocol communication channel between the remote socket client and the remote socket server comprises one of:
- an inter process communication mechanism;
- a universal serial bus (USB);
- an IP network; and
- a memory shared by the application processor and the modem subsystem.

13. The method of claim 8, wherein using the remote socket protocol to set up the remote socket connection between the remote socket client and the remote server comprises:
- transmitting a remote socket connection request from the remote socket client to the remote socket server based on the remote socket protocol;
- connecting the remote socket server to the remote server via the IP stack using the wireless communication access unit; and
- transmitting a remote socket connection response from the remote socket server to the remote socket client based on the remote socket protocol.

14. The method of claim 13, wherein using the remote socket protocol to set up the remote socket connection between the remote socket client and the remote server further comprises authenticating the remote socket client by the remote socket server before connecting the remote socket server to the remote server.

* * * * *

UNITED STATES PATENT AND TRADEMARK OFFICE
CERTIFICATE OF CORRECTION

PATENT NO. : 9,826,432 B2  
APPLICATION NO. : 15/035818  
DATED : November 21, 2017  
INVENTOR(S) : Runeson

Page 1 of 1

It is certified that error appears in the above-identified patent and that said Letters Patent is hereby corrected as shown below:

On the Title Page

In Item (73), under "Assignee", in Column 1, Line 1, delete "TELEFONAKTIEBBOLAGET" and insert -- TELEFONAKTIEBOLAGET --, therefor.

Signed and Sealed this  
Twenty-third Day of January, 2018

Joseph Matal  
*Performing the Functions and Duties of the*  
*Under Secretary of Commerce for Intellectual Property and*  
*Director of the United States Patent and Trademark Office*